(12) United States Patent
Sheridan et al.

(10) Patent No.: US 8,814,494 B1
(45) Date of Patent: *Aug. 26, 2014

(54) METHOD FOR SETTING A GEAR RATIO OF A FAN DRIVE GEAR SYSTEM OF A GAS TURBINE ENGINE

(71) Applicant: United Technologies Corporation, Hartford, CT (US)

(72) Inventors: William G. Sheridan, Southington, CT (US); Karl L. Hasel, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,863

(22) Filed: Mar. 11, 2014

Related U.S. Application Data

(63) Continuation of application No. 13/758,086, filed on Feb. 4, 2013, now Pat. No. 8,678,743.

(51) Int. Cl.
    *F01D 1/24* (2006.01)
    *F02C 7/36* (2006.01)

(52) U.S. Cl.
    CPC .............. *F02C 7/36* (2013.01); *F05D 2230/60* (2013.01)
    USPC ... 415/1; 415/65; 415/67; 415/69; 415/122.1; 416/1; 416/122; 416/126; 416/129; 416/170 R

(58) Field of Classification Search
    USPC ............. 415/1, 65, 67, 69, 122.1; 416/1, 122, 416/126, 129, 170 R
    See application file for complete search history.

(56) References Cited

U.S. PATENT DOCUMENTS

| | | | |
|---|---|---|---|
| 2,154,532 A | 4/1939 | Ryder | |
| 3,956,887 A | 5/1976 | MacDonald | |
| 5,102,379 A | 4/1992 | Pagluica et al. | |
| 5,389,048 A | 2/1995 | Carlson | |
| 5,466,198 A | 11/1995 | McKibbin et al. | |
| 5,685,797 A | 11/1997 | Barnsby et al. | |
| 6,223,616 B1 | 5/2001 | Sheridan | |
| 6,964,155 B2 | 11/2005 | McCune et al. | |
| 6,966,174 B2 * | 11/2005 | Paul | 60/226.1 |
| 7,021,042 B2 * | 4/2006 | Law | 60/226.1 |
| 7,726,113 B2 * | 6/2010 | Orlando et al. | 415/61 |
| 8,096,753 B2 | 1/2012 | Norris et al. | |
| 8,191,352 B2 | 6/2012 | Schilling | |

(Continued)

FOREIGN PATENT DOCUMENTS

EP    2199568    6/2010

OTHER PUBLICATIONS

Performance and Weight Estimates for an Advanced Open Rotor Engine, Eric S. Hendricks and Michael T. Tong, NASA/TM-2012-217710, AIAA-2012-3911, Sep. 2012, pp. 1-13.

(Continued)

*Primary Examiner* — Igor Kershteyn
(74) *Attorney, Agent, or Firm* — Carlson, Gaskey & Olds, P.C.

(57) ABSTRACT

A gas turbine engine includes a fan section including a fan rotatable about an axis. A speed reduction device is connected to the fan. The speed reduction device includes a planetary fan drive gear system with a planet gear ratio of at least 2.5. A bypass ratio is greater than about 11.0.

30 Claims, 2 Drawing Sheets

(56) References Cited

U.S. PATENT DOCUMENTS

| | | |
|---|---|---|
| 8,257,024 B1 | 9/2012 | Phillips et al. |
| 8,261,527 B1 | 9/2012 | Stearns et al. |
| 2006/0179818 A1 | 8/2006 | Merchant |
| 2011/0206498 A1 | 8/2011 | McCooey |
| 2012/0198817 A1 | 8/2012 | Suciu et al. |
| 2012/0213628 A1 | 8/2012 | McCune et al. |
| 2012/0237334 A1 | 9/2012 | McCune et al. |
| 2013/0004297 A1 | 1/2013 | Sheridan |
| 2013/0023378 A1 | 1/2013 | McCune et al. |

OTHER PUBLICATIONS

Ciepluch et al., "Quiet, Powered-Lift Propulsion," NASA Conference Publication 2077, Nov. 14-15, 1978 (429 pages).

Jane's Aero-Engines, Issue Seven, Mar. 2000, pp. 510-512.

* cited by examiner

METHOD FOR SETTING A GEAR RATIO OF A FAN DRIVE GEAR SYSTEM OF A GAS TURBINE ENGINE

CROSS-REFERENCE TO RELATED APPLICATIONS

This disclosure is a continuation of U.S. patent application Ser. No. 13/758,086 filed Feb. 4, 2013.

BACKGROUND

This disclosure relates to a gas turbine engine, and more particularly to a method for setting a gear ratio of a fan drive gear system of a gas turbine engine.

A gas turbine engine may include a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. Among other variations, the compressor section can include low and high pressure compressors, and the turbine section can include low and high pressure turbines.

Typically, a high pressure turbine drives a high pressure compressor through an outer shaft to form a high spool, and a low pressure turbine drives a low pressure compressor through an inner shaft to form a low spool. The fan section may also be driven by the inner shaft. A direct drive gas turbine engine may include a fan section driven by the low spool such that a low pressure compressor, low pressure turbine, and fan section rotate at a common speed in a common direction.

A speed reduction device, which may be a fan drive gear system or other mechanism, may be utilized to drive the fan section such that the fan section may rotate at a speed different than the turbine section. This allows for an overall increase in propulsive efficiency of the engine. In such engine architectures, a shaft driven by one of the turbine sections provides an input to the speed reduction device that drives the fan section at a reduced speed such that both the turbine section and the fan section can rotate at closer to optimal speeds.

Although gas turbine engines utilizing speed change mechanisms are generally known to be capable of improved propulsive efficiency relative to conventional engines, gas turbine engine manufacturers continue to seek further improvements to engine performance including improvements to thermal, transfer and propulsive efficiencies.

SUMMARY

In one exemplary embodiment, a gas turbine engine includes a fan section including a fan rotatable about an axis. A speed reduction device is connected to the fan. The speed reduction device includes a planetary fan drive gear system with a planet gear ratio of at least 2.5. A bypass ratio is greater than about 11.0.

In a further embodiment of the above, the gear ratio is less than or equal to 5.0.

In a further embodiment of any of the above, the gas turbine engine includes a fan pressure ratio that is below 1.7.

In a further embodiment of any of the above, the gas turbine engine includes a fan pressure ratio that is below 1.48.

In a further embodiment of any of the above, the fan blade tip speed of the fan section is greater than about 1000 ft/sec and less than about 1400 ft/sec.

In a further embodiment of any of the above, the planetary fan drive gear system includes a sun gear, a plurality of planetary gears, a ring gear, and a carrier.

In a further embodiment of any of the above, each of the plurality of planetary gears includes at least one bearing.

In a further embodiment of any of the above, the ring gear is fixed from rotation.

In a further embodiment of any of the above, a low pressure turbine is mechanically attached to the sun gear.

In a further embodiment of any of the above, a fan section is mechanically attached to the carrier.

In a further embodiment of any of the above, an input of the speed reduction device is rotatable in a first direction and an output of the speed reduction device is rotatable in the same first direction.

In a further embodiment of any of the above, a low pressure turbine section is in communication with the speed reduction device. The low pressure turbine section includes at least three stages.

In a further embodiment of any of the above, the bypass ratio is less than about 22.0.

In another exemplary embodiment, a method of improving performance of a gas turbine engine includes determining fan tip speed boundary conditions for at least one fan blade of a fan section, determining rotor boundary conditions for a rotor of a low pressure turbine, and utilizing stress level constraints in the rotor of the low pressure turbine and the at least one fan blade to determine if the rotary speed of the fan section and the low pressure turbine will meet a desired number of operating cycles. A bypass ratio is greater than about 6.0. A speed reduction device connects the fan section and the low pressure turbine and includes a planetary gear ratio of at least about 2.5.

In a further embodiment of any of the above, the planetary gear ratio is less than about 5.0.

In a further embodiment of any of the above, a fan pressure ratio is below 1.7.

In a further embodiment of any of the above, a fan pressure ratio is below 1.48.

In a further embodiment of any of the above, the bypass ratio is greater than about 11 and less than about 22.

In a further embodiment of any of the above, a fan blade tip speed of at least one fan blade is less than 1400 fps.

In a further embodiment of any of the above, if a stress level in the rotor or at least one fan blade is too high to meet a desired number of operating cycles, a gear ratio of a gear reduction device is lowered and the number of stages of the low pressure turbine is increased.

In a further embodiment of any of the above, if a stress level in the rotor or at least one fan blade is too high to meet a desired number of operating cycles, a gear ratio of a gear reduction device is lowered and an annular area of the low pressure turbine is increased.

In another exemplary embodiment, a fan drive gear module for a gas turbine engine includes a planetary fan drive gear system with a speed reduction ratio of at least 2.5. The speed reduction device is configured to drive a fan section with a bypass ratio greater than about 11.0.

In a further embodiment of the above, the speed reduction ratio is less than or equal to 5.0.

In a further embodiment of any of the above, the planetary fan drive gear system is configured to drive a fan section with a fan blade tip speed greater than about 1000 ft/sec and less than about 1400 ft/sec.

In a further embodiment of any of the above, the bypass ratio is less than about 22.0.

In another exemplary embodiment, a method of designing a gas turbine engine includes selecting fan tip speed boundary conditions for at least one fan blade of a fan section of a gas turbine engine, selecting rotor boundary conditions for a rotor of a fan drive turbine of the gas turbine engine and determining stress level constraints in the rotor of the fan drive turbine and the at least one fan blade to determine if the rotary speed of the fan section and the fan drive turbine will meet a desired number of operating cycles wherein a bypass ratio is greater than about 6.0 and connecting the fan section and the fan drive turbine through a speed reduction device that includes a planetary gear ratio of at least about 2.5.

In a further embodiment of the above, the planetary gear ratio is less than about 5.0.

In a further embodiment of any of the above, the bypass ratio of the gas turbine engine is greater than about 11 and less than about 22.

In a further embodiment of any of the above, the method includes lowering the speed reduction ratio of the speed reduction device and increasing a number of stages of the fan drive turbine responsive to determining that a stress level in the rotor or the at least one fan blade is outside a predefined number of operating cycles.

In a further embodiment of any of the above, the method includes lowering the speed reduction ratio of the speed reduction device and increasing an annular area of the fan drive turbine responsive to determining that a stress level in the rotor or the at least one fan blade is outside a predefined number of operating cycles.

The various features and advantages of this disclosure will become apparent to those skilled in the art from the following detailed description. The drawings that accompany the detailed description can be briefly described as follows.

DETAILED DESCRIPTION

Figure 1:
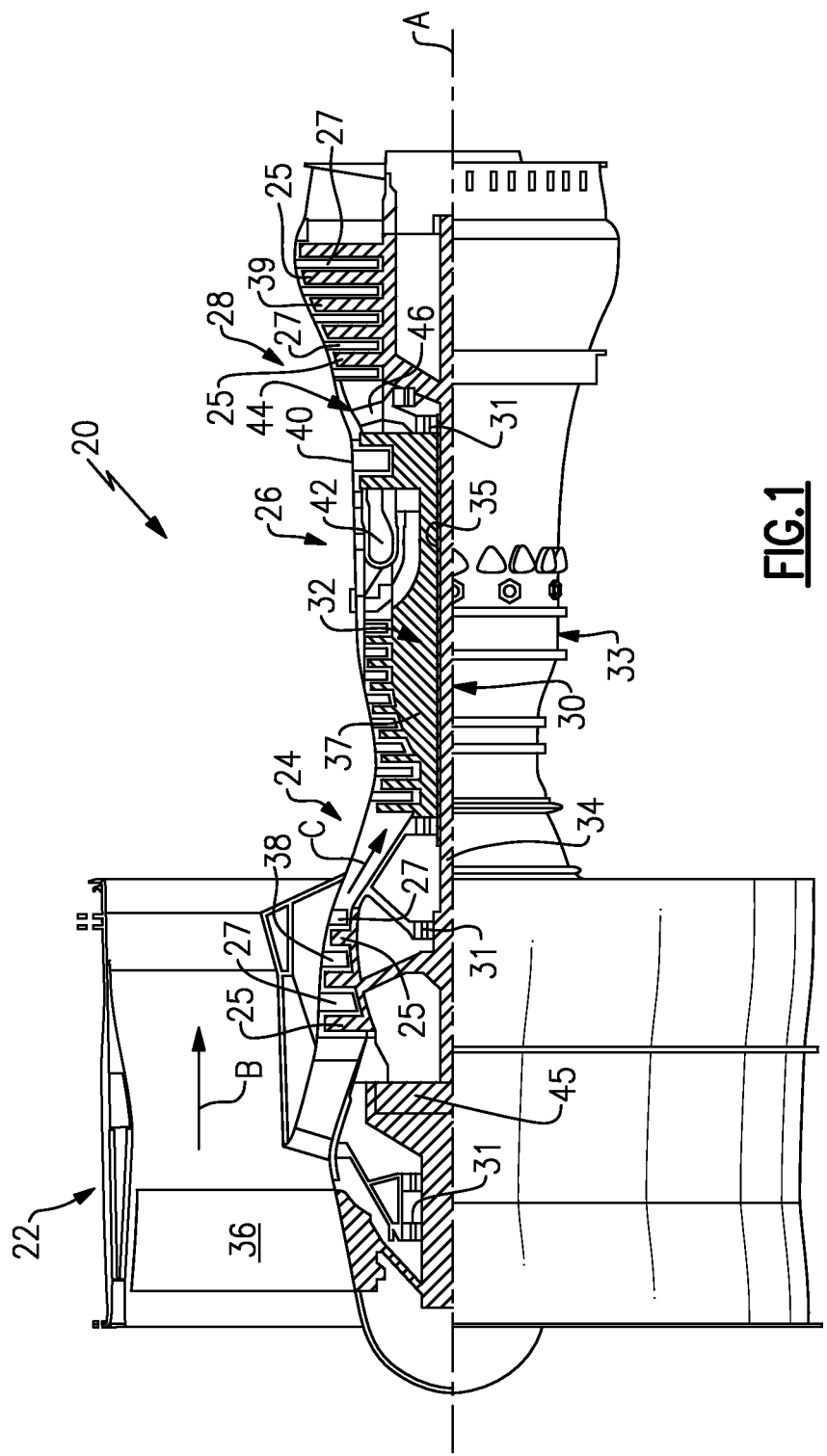
FIG. 1 illustrates a schematic, cross-sectional view of an example gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a two-spool turbofan gas turbine engine in the disclosed non-limiting embodiment, it should be understood that the concepts described herein are not limited to two-spool turbofan engines and these teachings could extend to other types of engines, including but not limited to, three-spool engine architectures.

The exemplary gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided, and the location of bearing systems 31 may be varied as appropriate to the application.

The low speed spool 30 generally includes an inner shaft 34 that interconnects a fan 36, a low pressure compressor 38 and a low pressure turbine 39. The inner shaft 34 can be connected to the fan 36 through a speed change mechanism, which in exemplary gas turbine engine 20 is illustrated as a geared architecture 45, such as a fan drive gear system 50 (see FIGS. 2 and 3). The speed change mechanism drives the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged in exemplary gas turbine 20 between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 50.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system, a star gear system, or other gear system. The geared architecture 45 enables operation of the low speed spool 30 at higher speeds, which can enable an increase in the operational efficiency of the low pressure compressor 38 and low pressure turbine 39, and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). In another non-limiting embodiment, the bypass ratio is greater than 11 and less than 22, or greater than 13 and less than 20. It should be understood, however, that the above parameters are only exemplary of a geared architecture engine or other engine using a speed change mechanism, and that the present disclosure is applicable to other gas turbine engines, including direct drive turbofans. In one non-limiting embodiment, the low pressure turbine 39 includes at least one stage and no more than eight stages, or at least three stages and no more than six stages. In another non-limiting embodiment, the low pressure turbine 39 includes at least three stages and no more than four stages.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. In another non-limiting embodiment of the example gas turbine engine 20, the Fan Pressure Ratio is less than 1.38 and greater than 1.25. In another non-limiting embodiment, the fan pressure ratio is less than 1.48. In another non-limiting embodiment, the fan pressure ratio is less than 1.52. In another non-limiting embodiment, the fan pressure ratio is less than 1.7. Low Corrected Fan Tip Speed is the actual fan tip speed divided by an industry standard temperature correction of $[(\text{Tram} °R)/(518.7°R)]^{0.5}$, where T represents the ambient temperature in degrees Rankine. The Low Corrected Fan Tip Speed according to one non-limiting embodiment of the example gas turbine engine 20 is less than about 1150 fps (351 m/s). The Low Corrected Fan Tip Speed according to another non-limiting embodiment of the example gas turbine engine 20 is less than about 1400 fps (427 m/s). The Low Corrected Fan Tip Speed according to another non-limiting embodiment of the example gas turbine engine 20 is greater than about 1000 fps (305 m/s).

Figure 2:
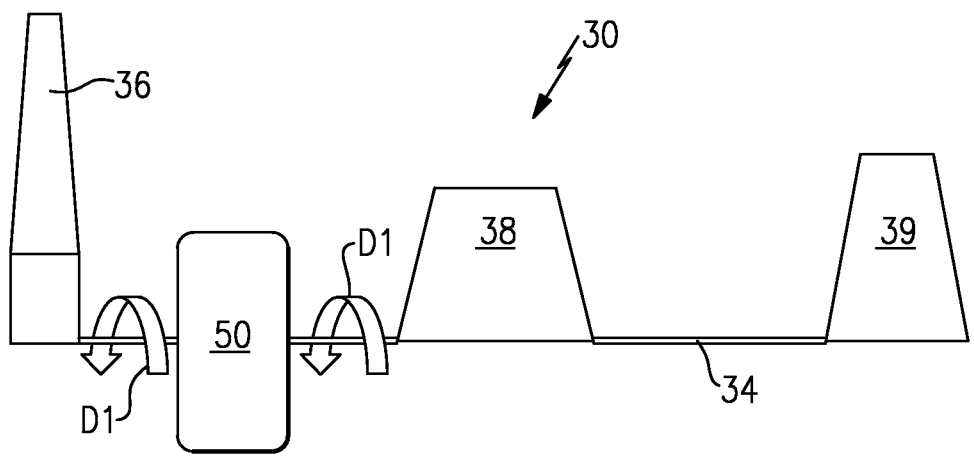
FIG. 2 illustrates a schematic view of one configuration of a low speed spool that can be incorporated into a gas turbine engine.

FIG. 2 schematically illustrates the low speed spool 30 of the gas turbine engine 20. The low speed spool 30 includes the fan 36, the low pressure compressor 38, and the low pressure turbine 39. The inner shaft 34 interconnects the fan 36, the low pressure compressor 38, and the low pressure turbine 39. The inner shaft 34 is connected to the fan 36 through the fan drive gear system 50. In this embodiment, the fan drive gear system 50 provides for co-rotation of the low pressure turbine 39 and the fan 36. For example, the fan 36 rotates in a first direction D1 and the low pressure turbine 39 rotates in the same first direction D1 as the fan 36.

Figure 3:
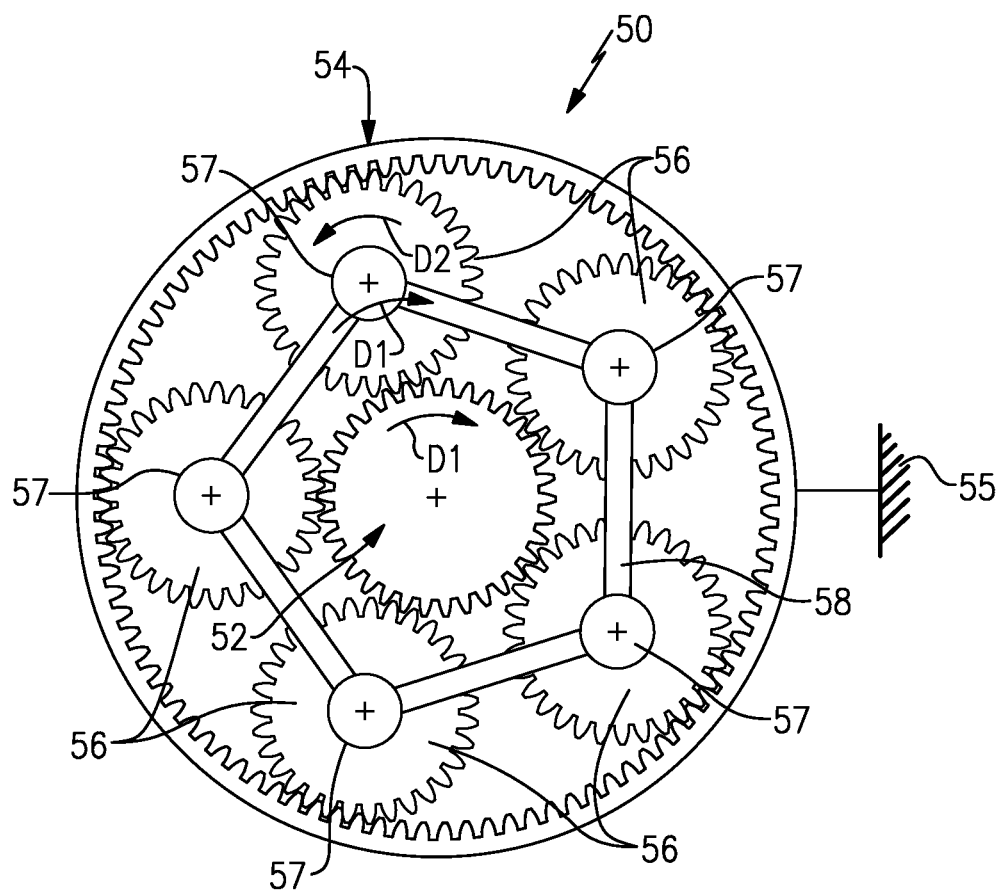
FIG. 3 illustrates a fan drive gear system that can be incorporated into a gas turbine engine.

FIG. 3 illustrates one example embodiment of the fan drive gear system 50 incorporated into the gas turbine engine 20 to provide for co-rotation of the fan 36 and the low pressure turbine 39. In this embodiment, the fan drive gear system 50 includes a planetary gear system having a sun gear 52, a fixed ring gear 54 disposed about the sun gear 52, and a plurality of planetary gears 56 having journal bearings 57 positioned between the sun gear 52 and the ring gear 54. A carrier 58 carries and is attached to each of the planetary gears 56. In this embodiment, the fixed ring gear 54 does not rotate and is connected to a grounded structure 55 of the gas turbine engine 20.

The sun gear 52 receives an input from the low pressure turbine 39 (see FIG. 2) and rotates in a first direction D1 thereby turning the plurality of planetary gears 56 in a second direction D2 that is opposite of the first direction D1. Movement of the plurality of planetary gears 56 is transmitted to the carrier 58, which rotates in the first direction D1. The carrier 58 is connected to the fan 36 for rotating the fan 36 (see FIG. 2) in the first direction D1.

A planet system gear ratio of the fan drive gear system 50 is determined by measuring a diameter of the ring gear 54 and dividing that diameter by a diameter of the sun gear 52 and adding one to the quotient. In one embodiment, the planet system gear ratio of the fan drive gear system 50 is between 2.5 and 5.0. When the planetary system gear ratio is below 2.5, the sun gear 52 is relatively much larger than the planetary gears 56. This size differential reduces the load the planetary gears 56 are capable of carrying because of the reduction in size of the journal bearings 57. When the system gear ratio is above 5.0, the sun gear 52 is relatively much smaller than the planetary gears 56. This size differential increases the size of the planetary gear 56 journal bearings 57 but reduces the load the sun gear 52 is capable of carrying because of its reduced size and number of teeth. Alternatively, roller bearings could be used in place of journal bearings 57.

Improving performance of the gas turbine engine 20 begins by determining fan tip speed boundary conditions for at least one fan blade of the fan 36 to define the speed of the tip of the fan blade. The maximum fan diameter is determined based on the projected fuel burn derived from balancing engine efficiency, mass of air through the bypass flow path B, and engine weight increase due to the size of the fan blades.

Boundary conditions are then determined for the rotor of each stage of the low pressure turbine 39 to define the speed of the rotor tip and to define the size of the rotor and the number of stages in the low pressure turbine 39 based on the efficiency of low pressure turbine 39 and the low pressure compressor 38.

Constraints regarding stress levels in the rotor and the fan blade are utilized to determine if the rotary speed of the fan 36 and the low pressure turbine 39 will meet a desired number of operating life cycles. If the stress levels in the rotor or the fan blade are too high, the gear ratio of the fan drive gear system 50 can be lowered and the number of stages of the low pressure turbine 39 or annular area of the low pressure turbine 39 can be increased.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:
1. A gas turbine engine comprising:
a fan section including a fan rotatable about an axis; and
a speed reduction device connected to the fan, wherein the speed reduction device includes a planetary fan drive gear system with a planet gear ratio of at least 2.5, wherein a bypass ratio is greater than about 11.0.

2. The gas turbine engine of claim 1, wherein the gear ratio is less than or equal to 5.0.

3. The gas turbine engine of claim 2, including a fan pressure ratio that is below 1.7.

4. The gas turbine engine of claim 2, including a fan pressure ratio that is below 1.48.

5. The gas turbine engine of claim 4, wherein the fan blade tip speed of the fan section is greater than about 1000 ft/sec and less than about 1400 ft/sec.

6. The gas turbine engine of claim 1, wherein the planetary fan drive gear system includes a sun gear, a plurality of planetary gears, a ring gear, and a carrier.

7. The gas turbine engine of claim 6, wherein each of the plurality of planetary gears includes at least one bearing.

8. The gas turbine engine of claim 7, wherein the ring gear is fixed from rotation.

9. The gas turbine engine of claim 8, wherein a low pressure turbine is mechanically attached to the sun gear.

10. The gas turbine engine of claim 9, wherein a fan section is mechanically attached to the carrier.

11. The gas turbine engine of claim 10, wherein an input of the speed reduction device is rotatable in a first direction and an output of the speed reduction device is rotatable in the same first direction.

12. The gas turbine engine of claim 11, including a low pressure turbine section in communication with the speed reduction device, wherein the low pressure turbine section includes at least three stages.

13. The gas turbine engine of claim 1, wherein the bypass ratio is less than about 22.0.

14. A method of improving performance of a gas turbine engine comprising:
   determining fan tip speed boundary conditions for at least one fan blade of a fan section;
   determining rotor boundary conditions for a rotor of a low pressure turbine; and
   utilizing stress level constraints in the rotor of the low pressure turbine and the at least one fan blade to determine if the rotary speed of the fan section and the low pressure turbine will meet a desired number of operating cycles, wherein a bypass ratio is greater than about 6.0,
   wherein a speed reduction device connects the fan section and the low pressure turbine and includes a planetary gear ratio of at least about 2.5.

15. The method of claim 14, wherein the planetary gear ratio is less than about 5.0.

16. The method of claim 15, wherein a fan pressure ratio is below 1.7.

17. The method of claim 16, wherein a fan pressure ratio is below 1.48.

18. The method of claim 17, wherein the bypass ratio is greater than about 11 and less than about 22.

19. The method of claim 18, wherein a fan blade tip speed of the at least one fan blade is less than 1400 fps.

20. The method of claim 14, wherein if a stress level in the rotor or the at least one fan blade is too high to meet a desired number of operating cycles, a gear ratio of a gear reduction device is lowered and the number of stages of the low pressure turbine is increased.

21. The method of claim 20, wherein if a stress level in the rotor or the at least one fan blade is too high to meet a desired number of operating cycles, a gear ratio of a gear reduction device is lowered and an annular area of the low pressure turbine is increased.

22. A fan drive gear module for a gas turbine engine comprising:
   a planetary fan drive gear system with a speed reduction ratio of at least 2.5, wherein the speed reduction device is configured to drive a fan section with a bypass ratio greater than about 11.0.

23. The fan drive gear module of claim 22, wherein the speed reduction ratio is less than or equal to 5.0.

24. The fan drive gear module of claim 22, wherein the planetary fan drive gear system is configured to drive a fan section with a fan blade tip speed greater than about 1000 ft/sec and less than about 1400 ft/sec.

25. The fan drive gear module of claim 22, wherein the bypass ratio is less than about 22.0.

26. A method of designing a gas turbine engine comprising:
   selecting fan tip speed boundary conditions for at least one fan blade of a fan section of a gas turbine engine;
   selecting rotor boundary conditions for a rotor of a fan drive turbine of the gas turbine engine;
   determining stress level constraints in the rotor of the fan drive turbine and the at least one fan blade to determine if the rotary speed of the fan section and the fan drive turbine will meet a desired number of operating cycles, wherein a bypass ratio is greater than about 6.0; and
   connecting the fan section and the fan drive turbine through a speed reduction device that includes a planetary gear ratio of at least about 2.5.

27. The method of claim 26, wherein the planetary gear ratio is less than about 5.0.

28. The method of claim 26, wherein the bypass ratio of the gas turbine engine is greater than about 11 and less than about 22.

29. The method of claim 26, including lowering the speed reduction ratio of the speed reduction device and increasing a number of stages of the fan drive turbine responsive to determining that a stress level in the rotor or the at least one fan blade is outside a predefined number of operating cycles.

30. The method of claim 26, including lowering the speed reduction ratio of the speed reduction device and increasing an annular area of the fan drive turbine responsive to determining that a stress level in the rotor or the at least one fan blade is outside a predefined number of operating cycles.

* * * * *